(12) United States Patent
Sandolo

(10) Patent No.: US 6,349,889 B1
(45) Date of Patent: Feb. 26, 2002

(54) COFFEE BLENDING APPARATUS

(76) Inventor: Raffael Sandolo, 226 Thayer Pond Rd., Wilton, CT (US) 06897

( * ) Notice: Subject to any disclaimer, the term of this patent is extended or adjusted under 35 U.S.C. 154(b) by 0 days.

(21) Appl. No.: 09/837,146

(22) Filed: Apr. 18, 2001

(51) Int. Cl.[7] .............................. A23L 1/00; B02C 19/12
(52) U.S. Cl. .............................. 241/34; 99/484; 99/485; 99/286; 241/36; 241/38; 241/100; 241/101.6
(58) Field of Search ........................ 99/275, 286, 289 R, 99/357, 484, 485; 241/34, 36, 38, 100, 101.6, 101.8

(56) References Cited

U.S. PATENT DOCUMENTS

| | | | | |
|---|---|---|---|---|
| 3,182,919 A | * | 5/1965 | Geerlings | 241/101.6 |
| 4,112,831 A | * | 9/1978 | Scott | 99/306 |
| 4,815,633 A | * | 3/1989 | Kondo et al. | 99/286 X |
| 4,971,259 A | * | 11/1990 | Nidiffer | 241/34 |
| 5,237,910 A | * | 8/1993 | Chigira | 99/484 X |
| 5,277,869 A | * | 1/1994 | Glazer | 241/34 X |
| 5,280,859 A | * | 1/1994 | Rust et al. | 241/101.6 |
| 5,458,295 A | * | 10/1995 | Haber et al. | 241/100 |
| 5,462,236 A | * | 10/1995 | Knepler | 241/34 |
| 5,522,556 A | * | 6/1996 | Knepler | 241/34 |
| 5,603,458 A | | 2/1997 | Sandolo | |
| 5,632,449 A | | 5/1997 | Sandolo | |
| 5,653,157 A | * | 8/1997 | Miller | 99/484 X |
| 5,690,283 A | | 11/1997 | Sandolo | |
| 5,778,761 A | * | 7/1998 | Miller | 99/484 X |

* cited by examiner

Primary Examiner—Timothy F. Simone
(74) Attorney, Agent, or Firm—Fattibene & Fattibene; Arthur T. Fattibene; Paul A. Fattibene

(57) ABSTRACT

A coffee blending and dispensing apparatus whereby coffee purchasers can automatically customize a desired blend of two or more different types of coffee beans that weighs and packages the blended coffee in containers either as ground coffee blend or as a whole coffee bean blend. The blending and dispensing apparatus includes a plurality of coffee bins, each containing a predetermined type of coffee bean supported over a scale. Each coffee bin includes a controlled discharge for directing selected predetermined amount of coffee beans contained therein to the scale for weighing. Upon weighing, the selected blend of coffee beans are conveyed to a bagging station, where blended coffee beans may be finally packaged either in a ground form or a whole bean form. A computer and an associated printer are operatively connected to the coffee blending and dispensing apparatus whereby a customer can readily input the type and amount of the different selected coffees to formulate a desired blend and whereby the computer is programmed to sequence the operation of the apparatus to automatically effect the custom blending of the coffee to a customer's personal or individual taste or desire.

11 Claims, 3 Drawing Sheets

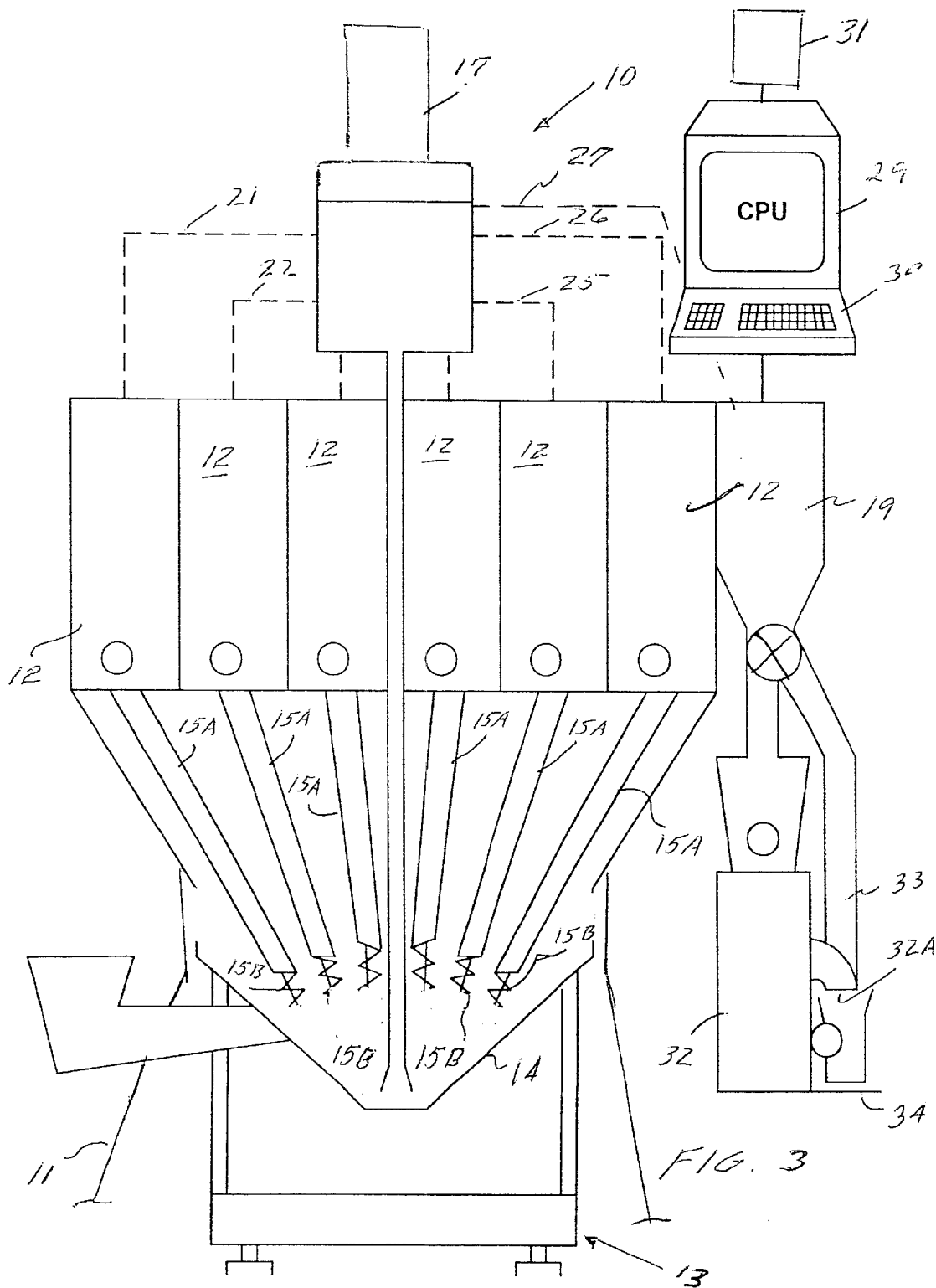

COFFEE BLENDING APPARATUS

FIELD OF THE INVENTION

This invention is directed to a coffee blending and dispensing apparatus and more specifically to a computer controlled coffee blending and dispensing apparatus whereby the individual customer may personally customize a coffee blend to his or her individual desire.

BACKGROUND OF THE INVENTION

For a long time, coffee has been a beverage enjoyed by many people worldwide, and the popularity of which is steadily increasing. Coffee is grown in many different countries. Because of the various climatic conditions under which such coffees are grown, each such coffee region produces coffee beans that have its own characteristic taste, smell and/or flavor. Such coffees, over time, have been combined and blended by the major coffee manufacturers and/or distributors in an effort to achieve a coffee flavor or taste acceptable to the mass market. In view of the increasing popularity of coffee, many gourmet type coffee houses have come into existence. The increasing popularity of such gourmet coffee houses has created a demand whereby coffee drinkers have developed a desire to customize their own individual special blends at the point of purchase.

Therefore, efforts have been made to develop coffee bean dispensing machines to meet this individual customizing demand. Such known efforts are disclosed in several of my prior patents, viz. U.S. Pat. Nos. 5,603,458; 5,632,449; and 5,690,283. This invention constitutes a further improvement and/or advance in customized coffee blending machines of the kind disclosed in the foregoing noted U.S. patents.

SUMMARY OF THE INVENTION

An object of this invention is to provide a coffee blender apparatus arranged and constructed to facilitate the loading of the coffee bins and the dispensing and weighing of the respective different types of coffee selected by a particular user to formulate the desired blend.

Another object is to provide a coffee blender apparatus with a timer and/or sensor for detecting the presence or absence of a container or bag at the loading or bagging station.

Another object is to provide a novel coffee blender apparatus that is relatively simple and positive in operation.

The foregoing objects and other features and advantages are attained by a coffee blender apparatus that includes a base or stand for supporting thereon a plurality of coffee bins, each bin containing a supply of a different type of coffee bean. In the illustrated embodiment, the respective coffee bins are circumferentially disposed on the base or stand. Mounted above the coffee bins is a distribution housing on which a source of negative pressure, e.g. a vacuum pump or motor, is supported. Below the coffee bins there is provided a scale to weigh the coffee beans that are selectively discharged from the respective coffee bins to form the desired mix or blend of the coffee beans. Each of the respective coffee bins is provided with a controlled outlet and a connected chute or discharge conduit for directing the coffee beans being discharged to the scale to be weighed.

A suction or distributor tube or conduit extends from the vacuum source to near the bottom of the scale. Connected to the distribution housing and distributor conduit are a plurality of branch conduits and an appropriate valving means for selectively connecting the suction distributor conduit to each of the respective branch conduits and associated coffee bins. A branch conduit also interconnects the distribution conduit to a receiving chamber to which the blended or mixed coffee beans are directed prior to bagging.

Operatively connected to the receiving chamber is an associated grinder and a coffee bean chute for directing either ground coffee or the whole coffee bean to a bagging station where the blended coffee is bagged. The arrangement is such that the customer may selectively grind the coffee beans or not grind the coffee beans according to his or her desire.

To load the coffee beans into their respective coffee bins, a loading hopper and associated chute is provided whereby the various types of coffee beans to be loaded in the respective bins are first directed to the scale and subsequently to the appropriate coffee bins by negative or suction pressure via the distribution conduit and connected branch conduits. Alternatively, the top of the respective bins may be provided with a hinged cover to effect the loading of the respective bins from the top.

The bagging station is provided with a suitable sensor and/or timer for sensing the presence or absence of a bag or container. The arrangement is such that the blended coffee in the receiving chamber will not be discharged unless a bag is sensed or present at the loading station.

In accordance with this invention, a central processing unit (CPU) is operatively connected to the coffee blender. The CPU is suitably programmed for controlling and sequencing the operation of the coffee blending apparatus whereby an individual customer may customize his or her own personal coffee blend. A printer is electrically connected to the CPU to effect the printing of a label containing relevant information, e.g. the type of coffees blended, weight, price, customer's name and/or any other relevant marketing information which is required and/or programmed into the CPU.

IN THE DRAWINGS

FIG. 3 is a schematic illustration of a modified coffee blender embodying the present invention.

DETAILED DESCRIPTION

Figure 1:
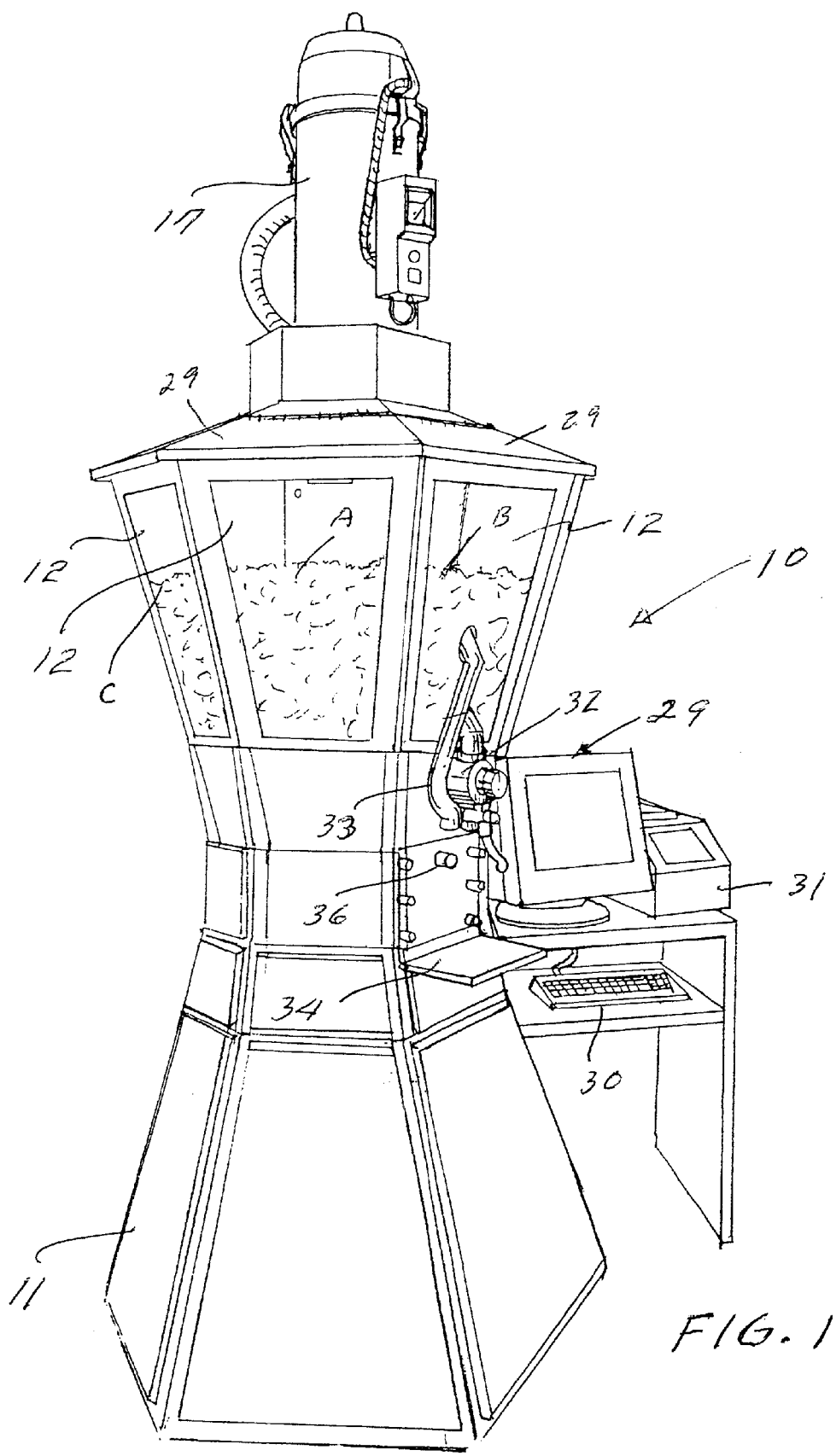
FIG. 1 is a perspective view of a coffee blender embodying the present invention.

Referring to the drawings, there is shown a coffee blending apparatus 10 which includes a suitable stand or base 11 on which there are supported a plurality of coffee bins 12. As best seen in FIG. 1, the coffee bins 12 are circumferentially supported on the base 11. In the illustrated embodiment, six (6) such coffee bins are shown. However, it will be understood that the number of coffee bins may vary and that the specific number of coffee bins making up the coffee blender is not critical to this invention. It will be understood that each such coffee bins 12 is loaded with a different type of coffee bean, i.e. a whole coffee bean grown in any of the well known coffee regions, e.g. Colombia, Jamaica, Hawaii, Ceylon, Brazil, India, etc. The various types of different coffee beans for purposes of illustration are identified as coffee types A, B, C, D, E and F.

Suitably supported in the base or stand 11 and below the respective coffee bins 12 is a scale 13 that includes a scale pan 14 for receiving and weighing the coffee beans making up the desired blend as will be hereinafter described. Connected to the respective coffee bins 12 is a discharge chute 15 for directing the respective selected coffee beans A-F being discharged from their respective coffee bins 12 and onto the scale pan 14 to form the desired coffee blend as will be described. A suitable control valve 16, e.g. a slide valve, rotary valve or flap valve, movable between an open and closed position, controls the opening and closing of the inlet end 15A of the respective discharge chutes 15; the dotted line showing the control valves 16 in the open position. The arrangement is such that when a respective valve 16 is shifted to an open position, the selected coffee in the associated bin 12 is allowed to be discharged by gravity from the associated bin 12 into its respective chute 12 for discharge onto the scale pan 14. As will be herein described, the duration of the valve 16 in its open position controls the amount of coffee beans that is discharged onto the scale pan 14.

Supported above the coffee bins 12 is a negative pressure source or vacuum pump 17 for imparting a negative or suction pressure to a distribution conduit 18 connected thereto. The distal end 18A of the distribution conduit 18 is located adjacent to and spaced from the bottom of the scale pan 14. As will be herein described, the distribution conduit 18 provides a means for loading the respective bins 12 with a supply of a specific coffee type to be dispensed therefrom, as well as a means for conveying the blended coffee beans deposited onto the scale pan 14 for conveyance to a receiving chamber 19 in preparation for being bagged either in a ground form or a whole bean form.

Connected to the distribution conduit 18 is a distributor or control valve 20 operative to selectively connect the distribution conduit 18 to any one of the several branch conduits 21, 22, 23, 24, 25 and 26, which are respectively connected in communication with one of the respective coffee bins 12. The distributor or control valve 20 also functions to connect the distributor conduit 18 to a blended coffee branch conduit 27 for directing the blended coffee beans deposited in the scale pan 14 to the receiving chamber 19.

To replenish or refill the respective coffee bins 12 with the specific type of coffee, e.g. A, B, C, D, E or F, a refill hopper 28 having a discharge opening 28A is in communication with the scale pan 14. When the coffee A disposed in bin 12 has been depleted, bin 12 may be replenished or refilled by pouring a supply of type A coffee beans into the refill hopper 28, whereby gravity causes the coffee beans A to empty onto the scale pan 14. With the distributor or control valve 20 set to connect the distribution conduit 18 in open communication with branch conduit 21, while closing off conduits 22 to 27 and actuating the negative pressure pump 17, the coffee beans A loaded onto the scale pan 14 are sucked up by the distribution conduit 18 by the negative pressure imparted thereto and conveyed to bin 12 through connecting branch conduit 21 to replenish it with coffee beans, type A. The other coffee bins 12 may also be similarly replenished with its respective coffee bean type B-F by resetting the distributor or control valve 20 to connect the distribution conduit 18 to the appropriate branch conduits 22–26 connected to the coffee bin 12 to be refilled.

Alternatively, where conditions permit, the top of the respective bins 12 may be provided with a hinge cover 29, free to open and close, by which the respective bins 12 may be replenished with its specific coffee bean type. However, the filling hopper means 28 described for replenishing the respective bins 12 with different type coffee beans is particularly advantageous where the height of the blending apparatus 10 renders it too high and/or impractical for loading the coffee beans through the top of the bin.

Operatively connected to the coffee blender 10 is a central processing unit (CPU) comprising a monitor 29, an associated keyboard 30, and a printer 31. It will be understood that the CPU is programmed to control and sequence the operation of the respective component parts whereby a customer, depending upon the information input to the CPU unit, can effect automatic blending of the various types of coffee beans as may be desired by the customer.

The coffee blender 10 is also provided with means whereby a customer may optionally package or bag the desired coffee blend either in ground form or whole bean form. This is attained by directing the blended coffee in the whole bean form from the scale 13 to a receiving chamber 19, which has its outlet end 19A adapted to be selectively disposed in communication with either a coffee grinder apparatus 32 or to a whole bean chute 33. The coffee grinder discharge outlet 32A and bean chute outlet 33A terminate at a bagging or loading station 34. A suitable selector valve 35 is located at the discharge end of the receiving chamber 19 for directing the blend of whole coffee beans to either the grinder to be ground or to the whole bean chute, depending upon the desire of a particular customer. The selector valve 35 may comprise a three way valve whereby in one position both the passageways to the grinder 32 and bean chute 33 are closed or in another position where one or the other passageways to either the grinder 32 or bean chute 33 is opened and closed respectively.

In accordance with this invention, a sensor 36 is located at the loading station to sense the presence of a bag or container 37 for receiving either the blended coffee in either a ground form or a whole bean form. Unless the sensor senses the presence of a bag or container 37 to receive the coffee blend at the loading station 34, the blended coffee beans received in chamber 19 will not be directed to either the grinder 32 or the whole bean chute 33, i.e. the valve 35 is rendered inoperative so as to prevent the blended coffee beans in receiving chamber 19 from being discharged therefrom until such time that the sensor senses the presence of a container 37 at the loading station.

The coffee blender 10 may also be provided with a timer 38 which is operatively connected to selector valve 35 to insure that the selective valve 35 remains in its operative or open position for a sufficient interval of time to ensure that the entire blend of coffee beans has passed to either the grinder 32 or the whole bean chute 33.

In operation, the coffee blending apparatus, with the respective coffee bins 12 fully loaded with its specific coffee bean type, is ready for operation. A customer desirous of purchasing his or her customized blend of coffee is required to input into the CPU unit such information as to the type and amount of coffee beans necessary to formulate the particular customer blend, e.g., 4 oz. of coffee bean A, 4 oz. of coffee been B, 4 oz. of coffee been C, and 4 oz. of coffee bean D. It will be understood that the type and amount of the different coffees selected can very according to the desire of any particular purchaser. Certain other information such as the customer's name end any other relevant information may be inputted into the CPU. As the price of the respective coffees may very according to type, the price for the amount of coffee selected may be automatically computed by the CPU program. When all of the necessary information has been inputted into the CPU and a start button is actuated, the CPU, as programmed, will commence the automatic sequencing operation of the coffee blending apparatus 10. The program will first sequence the actuation of the selected control valve 16 of the respective coffee bins whereby the amount of coffee beans in said bin 12 desired to make up a particular blend, is directed to the scale pen 14. It will be understood that the control valve 16 of each of the respective coffee bins containing the different types of coffee beans, when selected to make the desired blend, may be programmed to be either sequentially or simultaneously operated. Control valve 16 may comprise a sliding valve, damper type valve or a rotary valve. Simultaneous actuation of the control valve 16 of the selected coffee beans will result in reducing the amount of time for the dispensing of the respective types of coffee beans.

Upon forming the desired coffee blend and weighing the same on scale 13, the vacuum pump is then energized so that the mixed coffee beans resting in the scale pan 14 are sucked up distribution conduit 18 and conveyed through the distributor valve 20 to branch conduit 27 for conveying the coffee beans to the receiving chamber 19. Depending on the customer's selection or input into the CPU unit, the blended coffee beans discharged in the receiving chamber 19 are directed to either a grinder 32 where the coffee beans are ground, or to the whole bean chute 33 located at the loading station 34 where the selected coffee form is bagged.

In accordance with this invention, a sensor 36 is positioned in the loading station 34 to sense the presence or absence of a bag or container 37. Unless the sensor senses the presence of a bag 37, the selector valve 35 is maintained in a position whereby the discharge 19A to the grinder 32 and the bean chute 33 is closed. In such an event, the coffee beans are prevented from being discharged from the receiving chamber 19. As long as the sensor 36 senses a bag 37 at the loading station, the selector valve 35 is shifted to direct the coffee beans in chamber 19 to either the grinder 32 or whole bean chute 33 in accordance with the customer's input or desire.

The apparatus 10 may also be provided with a timer 38 operatively connected to selector valve 35 to insure that the selector valve 35 is maintained in an open position for a sufficient time interval so as to insure that the passage of all of the blended coffee beans in chamber 19 are conveyed either to the grinder 32 or the bean chute 33. In this manner, the customer is assured that the proper weight of the blended coffee purchased is deposited in the bag or container 37. Upon completion of the bagging of the blended coffee, the printer 31 will print out a label having all of the reliant information, e.g. the type and amount of the different coffees making up the blend, the total price and weight of the blended mix, and such other information as the establishment desires be printed on the label. The customer may then adhere the label to the bag or container 30 so as to comply with labeling requirements.

Figure 2:
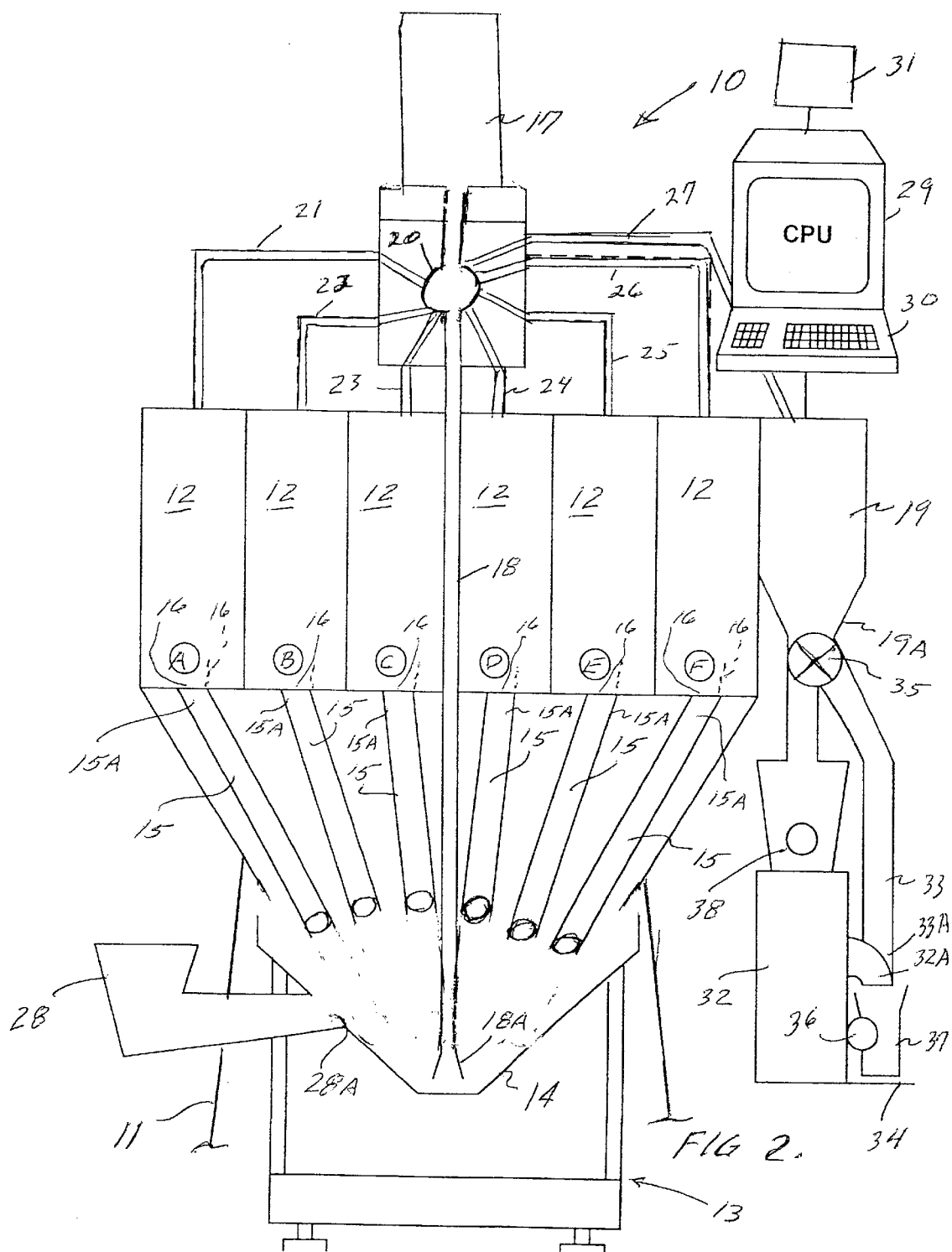
FIG. 2 is a schematic illustration of the coffee blender of FIG. 1.

The embodiment illustrated in FIG. 3 is identical to the embodiment described with respect to FIGS. 1 and 2 except that in FIG. 3, the discharge chutes 15A are provided with an auger 15B to convey the selected coffee beans from its respective bin 12 to the scale pan 14A. As shown in FIG. 3, each discharge chute 15A is provided with an auger which is activated or sequenced by the CPU program in a manner as hereinbefore described. The auger 15B is in the form of a rotating screw which functions to convey the coffee beans from the associated bins to the scale pan. In all other respects, the structure, function and operation of the embodiment of FIG. 3 is identical to that hereinbefore described with respect to FIGS. 1 and 2.

While the present invention has been described with respect to particular described embodiments, modifications and variations may be made without departing from the spirit and scope of this invention.

What is claimed is:

1. A coffee blending apparatus for blending a mixture of two or more different types of coffee comprising:
   a plurality of coffee bins, each of said coffee bins adapted to contain a supply of a different type of coffee bean from which a selection may be made,
   each of said coffee bins having a discharge opening,
   a scale located below said discharge opening,
   a discharge chute disposed in communication with each of said discharge openings for directing the selected coffee beans from its corresponding coffee bin to said scale,
   means for controlling the amount of coffee beans being discharged onto said scale,
   a receiving chamber,
   a distribution conduit connected in communication with said negative pressure source and said receiving chamber,
   said distribution conduit having an inlet end adjacent to and spaced from said scale whereby said distribution conduit conveys the selected coffee beans deposited on said scale to said receiving chamber under a negative pressure when said negative pressure source is activated,
   and a central processing unit programmed to sequence the actuation of control means and said negative pressure source in accordance with a predetermined selection.

2. A coffee blending apparatus as defined in claim 1 and further comprising:
   a loading station downstreamwise from said receiving chamber,
   a coffee grinder and a whole bean chute connected in communication with said receiving chamber located between said receiving chamber and said loading station,
   a valve means for selectively directing the blend of coffee beans in said receiving chamber to either said grinder or whole bean chute,
   and a sensing means located at said loading station for sensing the presence or absence of a container for receiving the coffee in either a ground or whole bean form.

3. A coffee blending apparatus as defined in claim 2 and further comprising:
   a timer for operatively controlling said valve means in an operative open position for a sufficient interval of time to ensure that the entire blend of coffee beans in said receiving chamber has passed to either the grinder or whole bean chute.

4. A coffee blending apparatus as defined in claim 1 and further comprising:
   a plurality of branch conduits connecting said distributor conduit in communication with each of said coffee beans,
   and a fill hopper disposed in communication with said scales whereby said coffee beans in each of said coffee bins may be replenished through said distribution conduit and connected branch conduits.

5. A coffee blender as defined in claim 1 wherein said control means comprising a valve operative to open and close said discharge chute.

6. A coffee blender as defined in claim 1 wherein said control means comprises an auger disposed in each of said discharge chutes to control the amount of selected coffee beans to be discharged onto said scale.

7. A coffee blending apparatus for blending two or more different types of coffee comprising:
   a base,
   a plurality of coffee bins circumferentially disposed on said base, each of said coffee bins being adapted to contain a different type of coffee bean,
   each of said coffee bins having a discharge opening,
   means for valving each of said discharge openings,
   a discharge chute connected in communication with each of said discharge openings,
   a scale supported on said base below said discharge chutes for receiving the respective coffee beans exiting said discharge chutes,
   a source of negative pressure,
   a distribution conduit connected in communication with said negative pressure source,
   a branch conduit connecting said distribution conduit in communication with each of said coffee beans,
   a distributor valve for selectively connecting one of said branch conduits to said distributor conduit,
   a refill hopper connected in communication with said scale,
   a central processing unit,
   a receiving chamber,
   a blended coffee bean branch conduit connecting said distribution conduit to said receiving chamber for conveying the selected coffee beans deposited on the scale to the receiving chamber by negative pressure,
   a distributor control valve for selectively connecting each of said branch conduits in or out of communication with said distribution conduit,
   and said central processing unit (CPU) being programmed to selectively control said valving means, negative pressure source and distributor control valve to effect a customized coffee blend or to effect replenishing the respective coffee bin with coffee beans.

8. A coffee blending apparatus as defined in claim 7 and further comprising:
   a loading station,
   a coffee grinder connected in communication with said receiving chamber, and
   a coffee bean chute also connected in communication with said receiving station,
   a selector valve controlling the outlet of said receiving chamber for directing the blend of coffee beans conveyed to said receiving chamber to either the grinder or the whole bean chute whereby the blended coffee is finally directed to said loading station either as a ground coffee blend or a whole coffee bean blend.

9. A coffee blending apparatus as defined in claim 8 and further comprising a sensor located at the loading station for sensing the presence or absence of a container thereat.

10. A coffee blending apparatus as defined in claim 8 and further comprising a timer operatively connected to said selector valve for maintaining said selector valve in the operative position for a predetermined time interval to insure that all of the blended coffee, either in the ground form or whole bean form, has passed through said grinder or whole bean chute and into the container sensed at the loading station.

11. A coffee blending apparatus for blending at least two or more different types of coffee beans into an individualized and customized coffee blend either as a ground form or a whole bean form comprising:
   a base,
   a plurality of coffee bins supported on said base, each of said coffee bins being adapted to contain a supply of a particular type of coffee bean,
   each of said coffee bins having a controlled outlet,
   a scale supported on said base below each of said controlled outlets for receiving and weighing the coffee beans released from the selected bins,
   a refill hopper connected in communication with said scale,
   a negative pressure source,
   a distributor conduit connected in communication with said negative pressure source,
   said distributor conduit having a distal end adjacent to and slightly spaced from said scale whereby the coffee beans comprising the coffee blend and deposited on said scale may be sucked up and conveyed through said distributor conduit by negative pressure,
   a receiving chamber connected in communication with said distributor conduit for receiving the blend of coffee beans conveyed therethrough,
   a branch conduit interconnecting each of said coffee bins to said distributor conduit,
   a distributor valve for selectively connecting said distributor conduit to each of said branch conduits to effect the refilling of the coffee bin or directing the whole bean blend to said receiving chamber,
   a grinder and a whole bean chute connected to said receiving chamber,
   a selector valve for selectively directing the whole bean blend to either the grinder or whole bean chute,
   a loading station,
   a sensor located in the loading station to sense the presence or absence of a container,
   a timer operatively connected to said selector valve to maintain said selector valve in its operative position for a predetermined time interval,
   and a central processing unit (CPU) programmed to sequence the actuation of said controlled outlets of said coffee bins, said negative pressure source, and the distributor valve in accordance with a user's predetermined selection.

* * * * *